United States Patent
Murali et al.

(10) Patent No.: US 11,676,039 B2
(45) Date of Patent: Jun. 13, 2023

(54) OPTIMAL INTERPRETABLE DECISION TREES USING INTEGER LINEAR PROGRAMMING TECHNIQUES

(71) Applicant: INTERNATIONAL BUSINESS MACHINES CORPORATION, Armonk, NY (US)

(72) Inventors: Pavankumar Murali, Ardsley, NY (US); Haoran Zhu, Madison, WI (US); Dung Tien Phan, Pleasantville, NY (US); Lam Nguyen, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 550 days.

(21) Appl. No.: 16/797,401

(22) Filed: Feb. 21, 2020

(65) Prior Publication Data

US 2021/0264290 A1    Aug. 26, 2021

(51) Int. Cl.
*G06N 5/01*    (2023.01)
*G06N 5/04*    (2023.01)

(52) U.S. Cl.
CPC ................ *G06N 5/01* (2023.01); *G06N 5/04* (2013.01)

(58) Field of Classification Search
CPC ...... G06N 5/003; G06N 5/04; G06F 21/6245; G06F 2221/21
See application file for complete search history.

(56) References Cited

U.S. PATENT DOCUMENTS

| | | | |
|---|---|---|---|
| 6,385,607 B1 | 5/2002 | Lyengar et al. | |
| 7,085,615 B2 | 8/2006 | Persson et al. | |
| 8,055,358 B2 | 11/2011 | Blevins et al. | |
| 10,095,682 B2 | 10/2018 | Polega et al. | |
| 2004/0199484 A1 | 10/2004 | Smith et al. | |
| 2009/0003217 A1 | 1/2009 | Ferra et al. | |
| 2009/0319093 A1* | 12/2009 | Joos | H02J 3/38 700/297 |
| 2010/0306001 A1 | 12/2010 | Discenzo et al. | |
| 2011/0130850 A1 | 6/2011 | Zheng et al. | |

(Continued)

FOREIGN PATENT DOCUMENTS

| | | |
|---|---|---|
| CN | 109492712 A | 3/2019 |
| CN | 109492833 A | 3/2019 |
| CN | 101752866 A | 6/2021 |

OTHER PUBLICATIONS

Aghaei et al. "Learning Optimal and Fair Decision Trees for Non-Discriminative Decision-Making". 33rd AAAI Conference on Artificial Intelligence. 2019. 9p.

(Continued)

*Primary Examiner* — Joseph L Greene
(74) *Attorney, Agent, or Firm* — Cantor Colburn LLP; Michael A. Petrocelli

(57) ABSTRACT

Aspects of the invention include an optimal interpretable decision tree using integer linear programming techniques. A non-limiting example computer-implemented method includes receiving, using a processor, a plurality of data inputs from a process and selecting, using the processor, a data subset from the plurality of data inputs by solving linear programming to obtain a solution. The method builds and optimizes, using the processor, an optimal decision tree based on the data subset and alerts, using the processor, a user when a prediction of the optimal decision tree is greater than a threshold value.

17 Claims, 6 Drawing Sheets

(56) References Cited

U.S. PATENT DOCUMENTS

| | | | |
|---|---|---|---|
| 2011/0137842 A1 | 6/2011 | Rotondo | |
| 2011/0301723 A1 | 12/2011 | Pekar et al. | |
| 2014/0372158 A1* | 12/2014 | Favero | G06Q 30/0251 705/7.11 |
| 2015/0199606 A1 | 7/2015 | Raghunathan et al. | |
| 2015/0324329 A1 | 11/2015 | Blevins et al. | |
| 2016/0370772 A1 | 12/2016 | Tanartkit et al. | |
| 2017/0024669 A1 | 1/2017 | Lustig | |
| 2017/0192397 A1 | 7/2017 | Vedam et al. | |
| 2018/0348717 A1 | 12/2018 | Zhao et al. | |
| 2019/0265685 A1 | 8/2019 | Lee et al. | |
| 2020/0111018 A1* | 4/2020 | Golovin | G06F 11/3409 |
| 2020/0285936 A1* | 9/2020 | Sen | G06Q 10/1095 |
| 2020/0320221 A1* | 10/2020 | Altug | G06F 21/6254 |
| 2020/0334577 A1* | 10/2020 | Anderson | G06Q 50/02 |
| 2020/0372400 A1* | 11/2020 | Carreira-Perpiñán | G06N 5/003 |

OTHER PUBLICATIONS

Bertsimas et al. "Optimal Classification Trees", Machine Learning, 2017. 43p.

Boas et al.;Optimal Decision Trees for the Algorithm Selection Problem: Integer Programming Based Approaches; International Transactions in Operational Research (Sep. 24, 2019) 19p.

Gunluk et al. "Optimal Decision Trees for Categorical Data via Integer Programming". 2019. 27p.

Kisamori et al., "Model Bridging: To Interpretable Simulation Model From Neural Network". Data Science Laboratories, NEC Coopration. Sep. 19, 2019. 15p.

List of IBM Patents or Patent Applications Treated as Related; Date Filed: Feb. 21, 2020, 2 pages.

Murali et al., "Prediction Modeling in Sequential Flow Networks," U.S. Appl. No. 16/797,394, filed Feb. 21, 2020.

Verwer et al. "Learning Optimal Classification Trees Using a Binary Linear Program Formulation". In 33rd AAAI Conference on Artificial Intelligence, 2019. 8p.

International Search Report; International Application No. PCT IB2021/051239; International Filing Date: Feb. 15, 2021 dated May 21, 2021; 9 pages.

Gao, et al, "A decision tree based decomposition method for oil refinery scheduling" Chinese Journal of Chemical Engineering 26, 2018, pp. 1605-1612.

Genc, et al, Decision Tree-Based Preventative and Corrective Control Applications for Dynamic Security Enhancement in Power Grid Systems, IEEE Transactions on Power Systems, vol. 25, No. 3, 2010, pp. 1611-1619.

Phan, et al, "Lagrangian Duality and Branch-and-Bound Algorithms for Optimal Power Flow", Operations Research, 2012, vol. 60, No. 2, pp. 275-285.

Xu, et al, "Data cleaning in the process industries", Reviews in Chemical Engineering, 2015, pp. 453-490.

* cited by examiner

OPTIMAL INTERPRETABLE DECISION TREES USING INTEGER LINEAR PROGRAMMING TECHNIQUES

BACKGROUND

The present invention generally relates to prediction modeling, and more specifically, to optimal interpretable decision trees using integer linear programming techniques.

Prediction models are useful in process control environments. For example, blast furnaces, oil refineries, and supply chain management all rely on process controls. Deep neural networks ("DNN") and optimal decision trees ("ODT") may be used in process controls. DNN are an artificial neural network with multiple layers between the input and output. A DNN finds the correct mathematical manipulation to turn the input into the output. An ODT is a decision tree that has optimal trade-off between training accuracy and model simplicity.

SUMMARY

Embodiments of the present invention are directed to optimal interpretable decision trees using integer linear programming techniques. A non-limiting example computer-implemented method includes receiving, using a processor, a plurality of data inputs from a process and selecting, using the processor, a data subset from the plurality of data inputs by solving linear programming to obtain a solution. The method builds and optimizes, using the processor, an optimal decision tree based on the data subset and alerts, using the processor, a user when a prediction of the optimal decision tree is greater than a threshold value.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
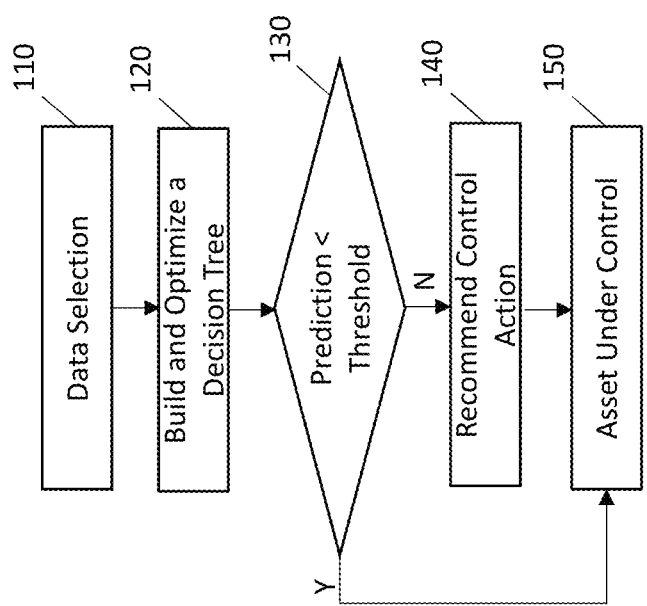
FIG. 1 depicts a flowchart of an optimal interpretable decision tree implementation process according to embodiments of the invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide a robust decision-tree based learner designed to learn provably optimal two or three deep trees using integer programming techniques. This provides for both interpretability and easy optimization. Through the use of mixed integer linear programming, global solutions to an ODT can be determined that are scalable. Embodiments of the present invention use data selection of training data beforehand without losing generalization by choosing a subset of data points that capture as much information of the entire dataset as possible and then a mixed-integer programming ("MIP") formulation for the ODT is only established on this data subset. In particular a linear programming ("LP") based subset selection procedure is implemented. Through implementation of embodiments of the present invention, practical applications, such as continuous process failure prediction, is accomplished.

Mathematical optimization techniques have always been a major tool for solving machine learning ("ML") problems, but MIP has been rarely considered before, mainly due to its poor tractability. However, with the development of MW theory, optimization solvers, and coupled with hardware improvement, there is an astonishing 800 billion factor speedup in MIP compared with 25 years ago. Therefore, ML is starting to embrace MIP-based models, and many methods are proposed to leverage mixed-integer programming to address classical ML tasks for which heuristics are traditionally employed. Among the attempts to study the interplay between MIP and ML, constructing ODT is among one of the most popular, mainly due to the combinatorial structure of a decision tree and its interpretability. Many related MIP formulations have been proposed to train ODT for different purposes.

Prior attempts at solutions have problems with interpretability and ease of optimization. Deep neural networks, for example, are essentially black boxes with little to no insight into how the network is internally operating. Highly non-linear models are hard to optimize. In other words, it is difficult to find the local minimum. Solutions involving deep decision trees used in the past are difficult and time consuming to optimize. They also may suffer from problems of interpretability.

One or more embodiments of the present invention address one or more of the above-described shortcomings of the prior art by providing technical solutions, including a simple decision tree that initially performs data-selection of training data. The subset is selected using a linear programming-based data-selection method. This subset of data is used for the MIP formulation for ODT. This provides performance enhancements in: interpretability (the degree to which a hum can understand the cause of a decision); tractability (the ability to return output within a reasonable time limit corresponding to the data size); training accuracy; and generalization ability or testing accuracy.

Turning now to FIG. 1, a flowchart of an optimal interpretable decision tree implementation process is generally shown in accordance with one or more embodiments of the present invention. In Block 110, data selection is performed. An LP-based data-selection process is implemented to act as a geometric approximation of a points set. The process assumes an optimal classification tree with very high training accuracy, and some data points in $I_0$ with label y are all correctly classified and were assigned into the same leaf node. In Block 110, the process drops all the data points with the same label y inside the convex hull of $I_o$ conv($\{x_i | i \in I_o\}$) from a training set, where $I_o$ is a subset of the training set and $x_i$ are removed training samples, since correctly classifying data points in $I_0$ would also automatically correctly classify points inside the convex hull. The number of data points inside the convex hull is maximized in some embodiments of the invention.

Since there is no information about the optimal classification tree beforehand, here the process uses the decision tree trained from some other heuristic method as a guide, then does the data-selection within each leaf node. Then among those data points within each leaf node, the process does the data-selection separately. In the end, the process combines all the data subsets selected from each leaf node, and uses MIP-ODT to train a classification tree on this dataset.

Figure 3:
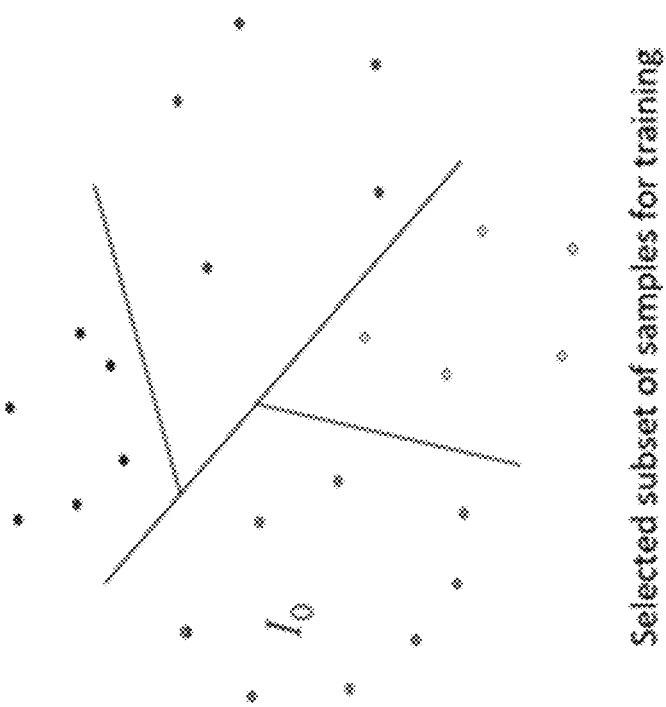
FIG. 3 depicts data set selection according to an embodiment of the present invention.
Figure 3:
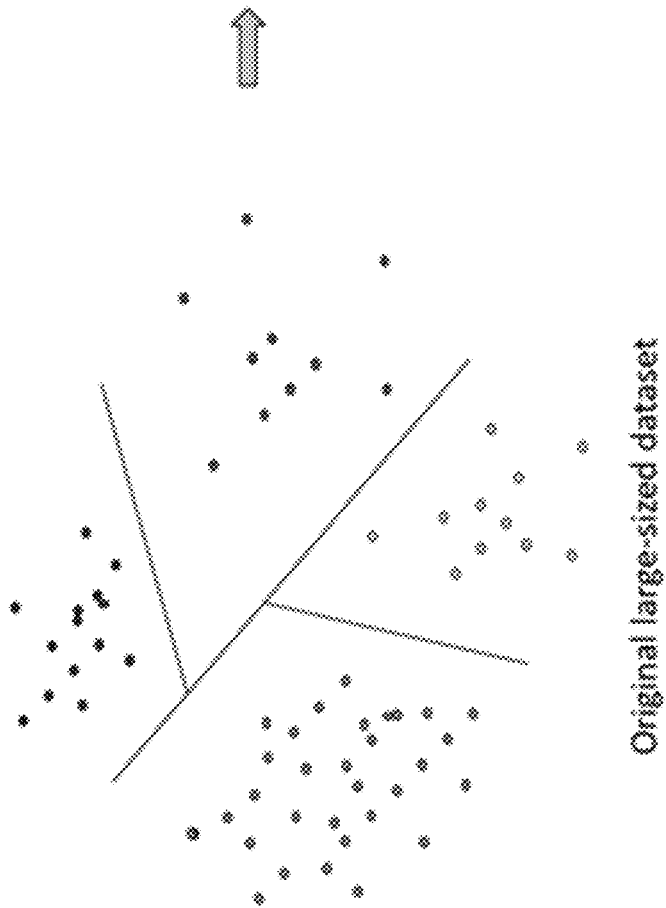

In general, for data-selection, the process selects data subsets $I_0$ according to the following two criteria: (1) The points inside conv($\{x_i | i \in I_o\}$) are as many as possible or are maximized; and (2) the number of selected sample points $|I_0|$ is as small as possible. For example, the remaining sample points for training $|I_0|$ is less than 10% of the original dataset, while the number of samples inside the convex hull of $I_0$ is more than 90%. An example is given in FIG. 3.

The basic binary LP to do data-selection is as follows: In each cluster $N \subseteq [n]$, there is:

$$\min_{s.t.} f^T a - g^T b$$
$$b_j x_j = \sum_{i \in N', i \neq j} \lambda_{ji} x_i, \forall j \in N'$$
$$\sum_{i \in N', i \neq j} \lambda_{ji} = b_j, \forall j \in N'$$
$$0 \leq \lambda_{ji} \leq a_i, \forall i \neq j \in N'$$
$$a_j + b_j \leq 1, \forall j \in N'$$
$$a_j, b_j \in \{0, 1\}.$$

Here f,g are two parameter vectors with non-negative components; $a_1$ denotes whether data point j is selected or not; $b_j$ denotes whether j can be expressed as the convex combination of selected data points or not; $\lambda_{ji}$ denotes the convex combination coefficient of point i when expressing point j as the convex combination of some other points.

When $b_j=1$, the first two constraints are just about expressing point $x_j$ as the convex combination of other points i with $\lambda_{ji}>0$, and when $b_j=0$ these two constraints hold since in that case $\lambda_{ji}=0$ for all i. The third inequality $0 \leq \lambda_{ji} \leq a_i$ means the process can use selected data points, which are those with $a_i=1$, to express other data points. The last constraint $a_j+b_j \leq 1$ states that any selected data point cannot be expressed as a convex combination of other selected data points. Depending on the choice of f,g and the convex combination constraint, generally there will be many different variants of the equation above.

When f=0, g=1, it follows that, the process can project out a, and obtain a simpler binary LP:

$$\min_{s.t.} \sum_{i \in N', b_i}$$
$$b_j x_j = \sum_{i \in N', i \neq j} \lambda_{ji} x_i, \forall j \in N'$$
$$\sum_{i \in N', i \neq j} \lambda_{ji} = b_j, \forall j \in N'$$
$$0 \leq \lambda_{ji} \leq 1 - b_j, \forall j \in N'$$
$$b_j \in \{0, 1\}.$$

The next result shows that this binary LP can be equivalently solved by solving the following LP:

$$\min_{s.t.} \sum_{i \in N', b_i}$$
$$b_j x_j = \sum_{i \in N', i \neq j} \lambda_{ji} x_i, \forall j \in N'$$
$$\sum_{i \in N', i \neq j} \lambda_{ji} = b_j, \forall j \in N'$$
$$0 \leq b_j \leq 1, \forall j \in N'$$

For any optimal solution (b, λ) of the above equations, there exists λ such that (b,λ) is an optimal solution of the previous equation, and vice versa.

For some pre-given threshold parameter $\beta 1, \beta 2 \in (0,1)$, the data selection process (Block 110) is provided in FIG. 2 discussed later.

Following data-selection, a decision tree is constructed and optimized as follows. Block 120. Without loss of generality, the process assumes the classes of the dataset to be [Y]:={1, 2, ..., Y}, where Y is the number of classes. Each data point i∈ [n] is denoted as: $(x_i, y_i)$, where n denotes the number of data points, $x_i$ is a d-dimensional vector, and $y_i \in \{1, \ldots, Y\}$. The process denote $F_q \subseteq [d]$ to be the index set of all numerical features, while $F_c$ denotes the index set of all categorical features. In this formulation the process considers datasets with only numerical features ($F_q=[n]$). The formulation is established for the balanced binary tree with depth D, even though the trained ODT can in fact be unbalanced. Here a branch node of the tree is denoted to be B:=$[2^D-1]$, and a leaf node is denoted as L:=$\{2^D, \ldots, 2^{D+1}-1\}$. The process also uses the notation $A_R(l)$ and $A_L(l)$ to represent a set of ancestors of leaf node l whose left (right) branch has been followed on the path from the root node to leaf node l.

When using MIP to train a decision tree, in most cases it is preferable to train a multivariable decision tree than the classic single variable decision tree, since for single variable decision tree, it requires additional binary variables to enforce up to one feature can be used for splitting at each branch node. As a generalization to single variable decision trees, multivariable decision trees are harder to train using common heuristic algorithms. The only difference between these two types of decision trees is whether the branching hyperplane has to be parallel to the axis or not. Since the multivariable decision tree is easier to train through an MIP model, the process is only described with respect to the optimal multivariable decision tree, even though the single variable decision tree can also be formulated by adding one more constraint for each branch node into the formulation. The MIP-ODT formulation is as follows:

$$\text{minimize} \sum_i c_i + \alpha_1 \sum_{i,b} m_{ib} + \alpha_2 \sum_{b,j} |h_{bj}| \quad (1a)$$

$$\text{s.t.} (y_i - Y)c_i \le y_i - \hat{y}_i \le (y_i - 1)c_i, \forall i \in [n] \quad (1b)$$

$$\hat{y}_i = \sum_{l \in \mathcal{L}} w_{il}, \forall i \in [n] \quad (1c)$$

$$w_{il} \ge e_{il}, u_l - w_{il} + e_{il} \ge 1, \forall i \in [n], l \in \mathcal{L} \quad (1d)$$

$$Ye_{il} + u_l - w_{il} \le Y, w_{il} \le Ye_{il}, \forall i \in [n], l \in \mathcal{L} \quad (1e)$$

$$g_b - \sum_{j \in \mathcal{F}_q} h_{bj} x_{ij} = p_{ib}^+ - p_{ib}^-, \forall i \in [n], b \in \mathcal{B} \quad (1f)$$

$$p_{ib}^+ \le M(1 - e_{il}), \forall i \in [n], l \in \mathcal{L}, b \in A_R(l) \quad (1g)$$

$$p_{ib}^- \le m_{ib} \ge e_{il}, \forall i \in [n], l \in \mathcal{L}, b \in A_R(l)$$

$$p_{ib}^- \le M(1 - e_{il}), \forall i \in [n], l \in \mathcal{L}, b \in A_L(l) \quad (1i)$$

$$p_{ib}^+ \le m_{ib} \ge e_{il}, \forall i \in [n], l \in \mathcal{L}, b \in A_L(l) \quad (1j)$$

$$\sum_{l \in \mathcal{L}} e_{il} = 1, \forall i \in [n] \quad (1k)$$

with variables $\hat{y}_i$, $w_{il}$, $h_{bj}$, $g_b \in \mathbb{R}$, $p_{ib}^+$, $p_{ib}^-$, $m_{ib} \in \mathbb{R}+$, $e_{il}$, $c_i \in \{0,1\}$, $u_l \in \{1, \ldots, Y\}$.

The balanced binary tree with depth D, is only characterized by two elements: the branching hyperplane at each branch node, and the label assigned on each leaf node. In our MIP-ODT, the branching hyperplane at branch node b is denoted as $<h_b, x_i>=g_b$, the branching rule is given by: data i goes to the left branch of $<h_b, x_i>g_b$, and goes to the right side otherwise. The label assigned to leaf node 1 is denoted as $u_l$, by assumption there is $u_l \in [Y]$.

Binary variables $c_i=\mathbb{1}$ {data i is mis-classified} and $e_{il}=\mathbb{1}$ {data i entering leaf node l}. Each data point, i, has to enter into one of the leaf nodes, so the process enforces $\Sigma_{l \in L} e_{il}=1$ for each $i \in [n]$, which is constraint (1k). $\hat{y}_i$ denotes the classified class for data i, so the process has constraint $\hat{y}_i = \Sigma_{l \in L} u_l e_{il}$ Introducing additional variables $w_{il}$ to represent these bilinear terms, the process performs the McCormick relaxation for $w_{il}=u_l e_{il}$ Those are constraints (1c)-(1e) Since here $e_{il}$ is enforced to be binary, then this McCormick relaxation is exact, in the sense that $\hat{y}_i=\Sigma_{l \in L} u_l e_{il}$ if and only if (1c)-(1e) hold for some extra variables w.

To formulate the relationship between ci and $\hat{y}_i$, the process has the first constraint (1b): When ci=0, meaning data i is correctly classified, there must have $\hat{y}_i=y_i$; When $c_i=1$, $\hat{y}_i$ is free to take any value among [1, Y].

Constraints (1f), (1g) and (1i) are about formulating the branching rule at each node $b \in B$: If data i goes to the left branch at node b, then $g_b - \Sigma_{j \in F_q} h_{bj} x_{ij} \ge 0$, if it goes to the right side, then $g_b - \Sigma_{j \in F_q} h_{bj} x_{ij} \le 0$. In MIP it is a conventional approach to formulate this relationship by separating $g_b - \Sigma_{j \in F_q} h_{bj} x_{ij}$ into a pair of complementary variables $p_{ib}^+$ and $p_{ib}^-$, and forcing one of these two variables to be 0 each time through big-M method. Here complementary means $p_{ib}^+$ and $p_{ib}^-$ cannot both be positive at the same time.

This is not exactly the same as our branching rule: when data i goes to the right branch, instead it should satisfy $g_b - \Sigma_{j \in F_q} h_{bj} x_{ij} > 0$ strictly. The only special case is when $p_{ib}^+ = p_{ib}^- = 0$.

Penalizing soft margin variables $m_{i,b}$ is motived by a support vector machine ("SVM"): the process desires the branching hyperplane to be not too close to all data points. This would give the objective function:

$$\Sigma_b \|h_b\|_2^2 + \alpha_1 \Sigma_{i,b} m_{i,b}.$$

By Occam's Razor principle, the process also takes the model simplicity (sparsity) into account, by adding an extra penalization term:

$$\sum_b \|h_b\|_0$$

Adding the misclassification number into objective yields:

$$\sum_i c_i + \sum_b \|h_b\|_2^2 + \alpha_1 \sum_{i,b} m_{i,b} + \alpha_2 \sum_b \|h_b\|_0$$

Linearizing $\|h_b\|_2^2$ and $\|h_b\|_0$ by $\|h_b\lambda_1$, the objective is:

$$\sum_i c_i + \alpha_1 \sum_{i,b} m_{i,b} + \alpha_2 \sum_{b,j} |h_{b,j}|$$

where $\alpha_1$ and $\alpha_2$ are some positive parameters.

A series of cutting planes may be used to further strengthen the MIP-ODT formulation above. Cutting planes include:

$$\forall l \in L, \sum_i c_i \ge \sum_i e_{i,l} - s_Y;$$

$$\forall l \in L, \sum_i (c_i + e_{i,l}) \ge s_1(Y - 2^D + 1); \text{ and}$$

$$s_1 + \ldots + s_{Y-2^D} \le \sum_i c_i \le n - s_Y.$$

Here the process denotes $\mathcal{N}_k := \{i \in [n]: x_{i,d}=k\}$, for any $k \in [Y]$, $S := \{|\mathcal{N}_k|: k \in [Y]\}$, and assume $|\mathcal{N}_1| = s_1 \le |\mathcal{N}_2| = s_2 \le \ldots \le |\mathcal{N}| = s_Y$.

Following creation of the ODT and optimization, a check is made to determine if the prediction that results from the ODT is less than a threshold value. Block 130. If so, assets in the process are under control. Block 150. If not, the process alerts a user and recommends a control action based on an analysis of the ODT. Block 140. A control action is implemented by adjusting the values of feature vector input $x_i$, which results in the change on the prediction output $y_i$.

The process described with respect to FIG. 1 may be used, for example, for continuous process failure prediction, which is a type of supervised anomaly prediction. It is designed to alert a user when a process failure is detected. It is informed based on historical process data and serves as the ground truth for training AI-based models. Various rule types may be implemented, such as threshold, trend, or multiple. Threshold, for example, may alert when a tank volume, for example, is below a minimum. Trend may alert when there is a decrease in throughput for example or when there is a power drop. Multiple may trigger when there is a loss of flow with no set-point or, for example, when a temperature is below a threshold and a rate above a second threshold is predicted.

With process failure prediction, an ODT is generated with the objective of predicting process failures. Sequences of process sensors and labeled upsets are converted to a classification problem. Failure events are extracted using a look ahead window to create training targets to enable learning models that anticipate events. Features are extracted from one or more look back windows using summary functions.

Figure 2:
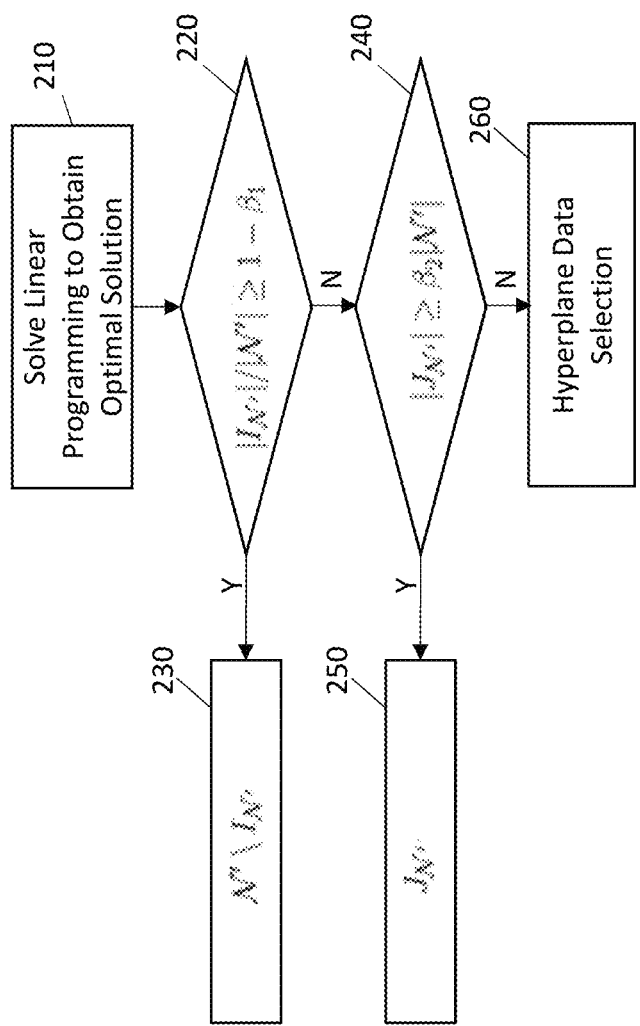
FIG. 2 depicts a flowchart of a data selection process according to embodiments of the invention.

FIG. 2 depicts a flowchart of a data selection process according to embodiments of the invention. Given $\beta_1, \beta_2 \in (0,1)$, solve $$\min_{s.t.} \sum_{i \in \mathcal{N}', b_i}$$

$$b_j x_j = \sum_{i \in \mathcal{N}', i \neq j} \lambda_{ji} x_i, \forall j \in \mathcal{N}'$$

$$\sum_{i \in \mathcal{N}', i \neq j} \lambda_{ji} = b_j, \forall j \in \mathcal{N}'$$

$$0 \leq b_j \leq 1, \forall j \in \mathcal{N}'.$$

and obtain the optimal solution (b, $\lambda$). Block 210. Denote $I_N := \{i \in N : b_i = 1\}$, $\lambda = T(\lambda)$, $J_N := \{i \in N : \exists j \in I_N \text{ s.t., } \lambda_{ji} \geq 1/(d+1)\}$, $K_N := N \setminus (I_N \cup J_N)$. At Block 220, if $|I_N|/|N| \geq 1 - \beta_1$, then select $N/I_N$ as the training set. Block 230. At Block 240, if $|J_N| \geq \beta_2 |N| \geq$, then select $J_N$ as the training set. Block 250. Otherwise, at Block 260, for $K_N$, perform hyperplane data-selection and pick the first $\beta_2 |N| - |J_N|$ points, together with $J_N$ as the selected training set.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
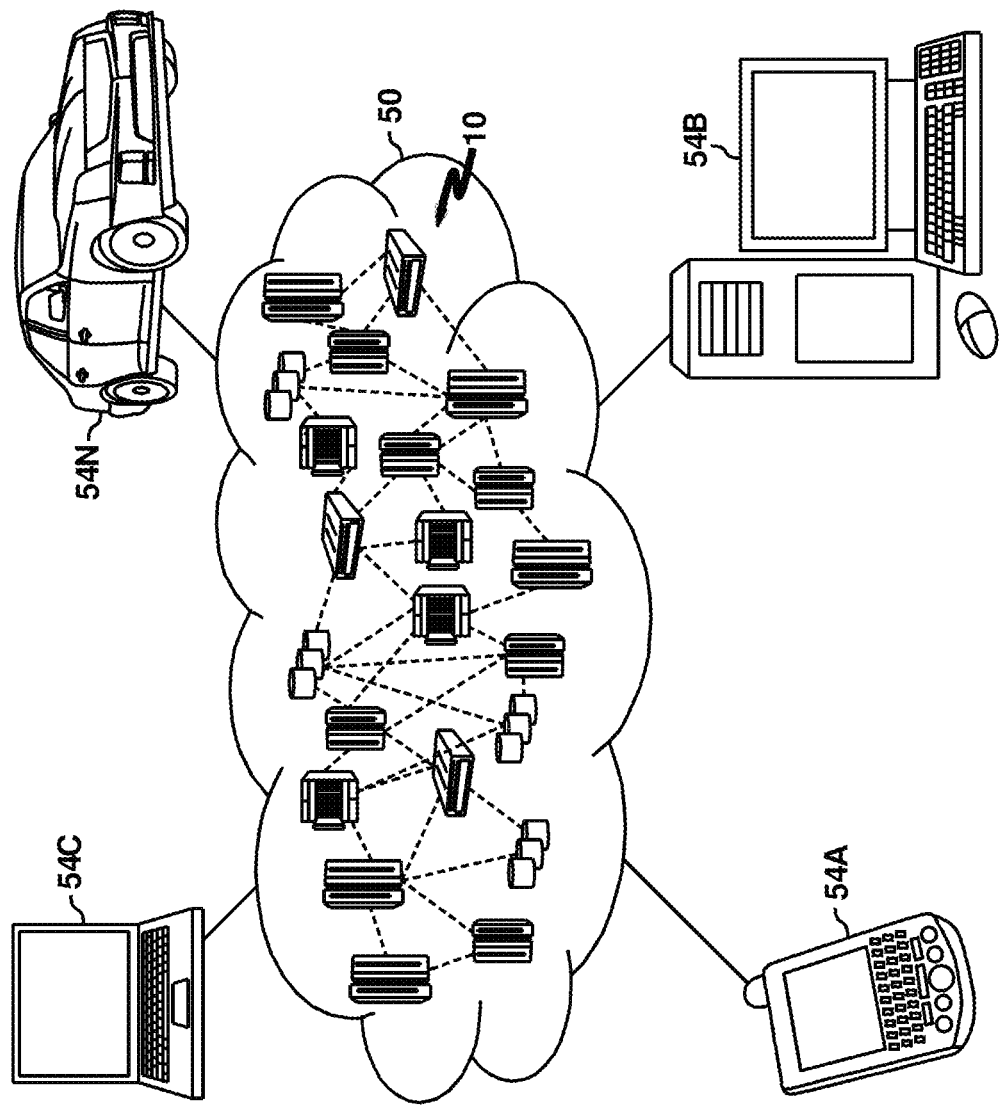
FIG. 4 depicts a cloud computing environment according to an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
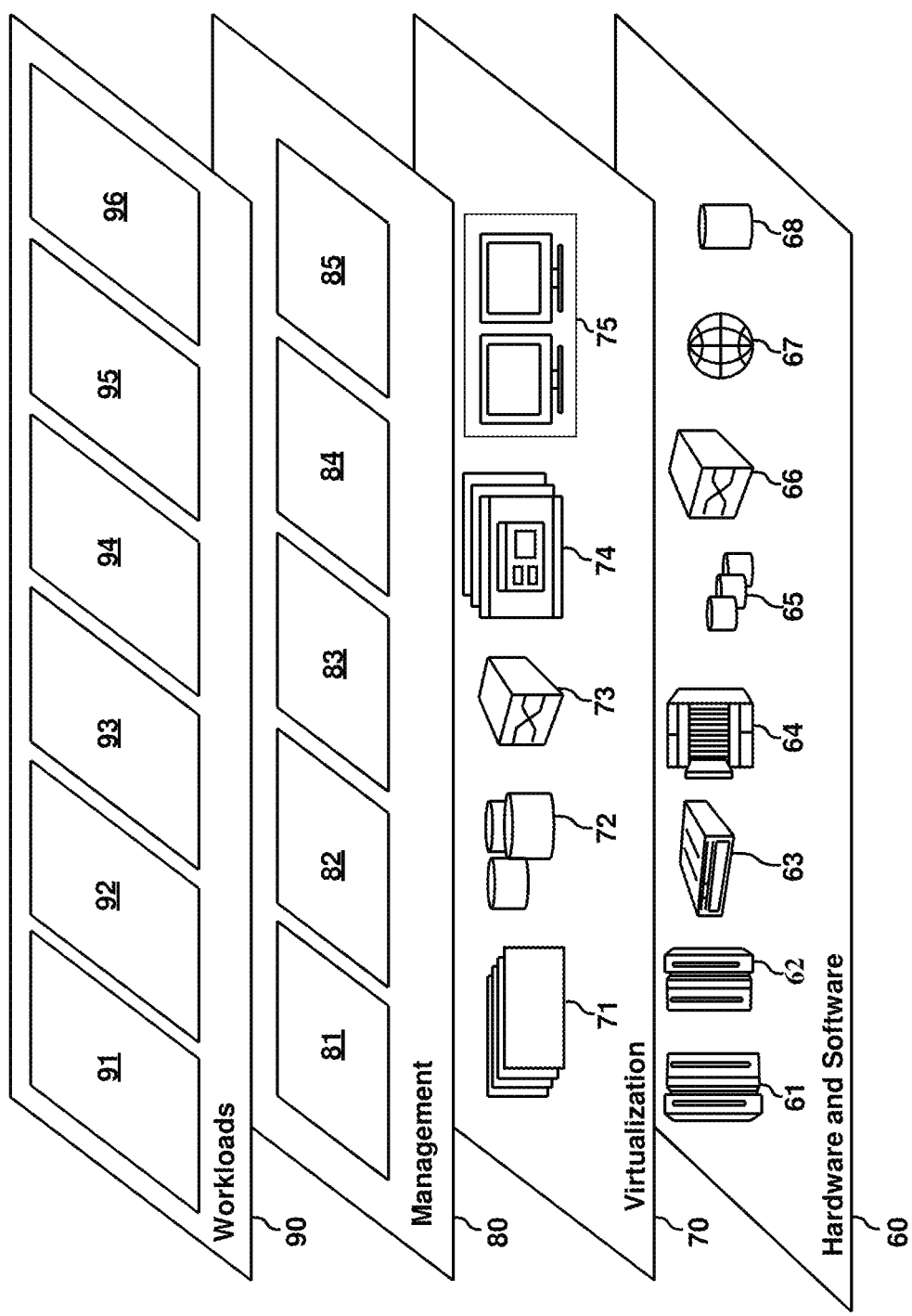
FIG. 5 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and ODT building and optimization processing 96.

Figure 6:
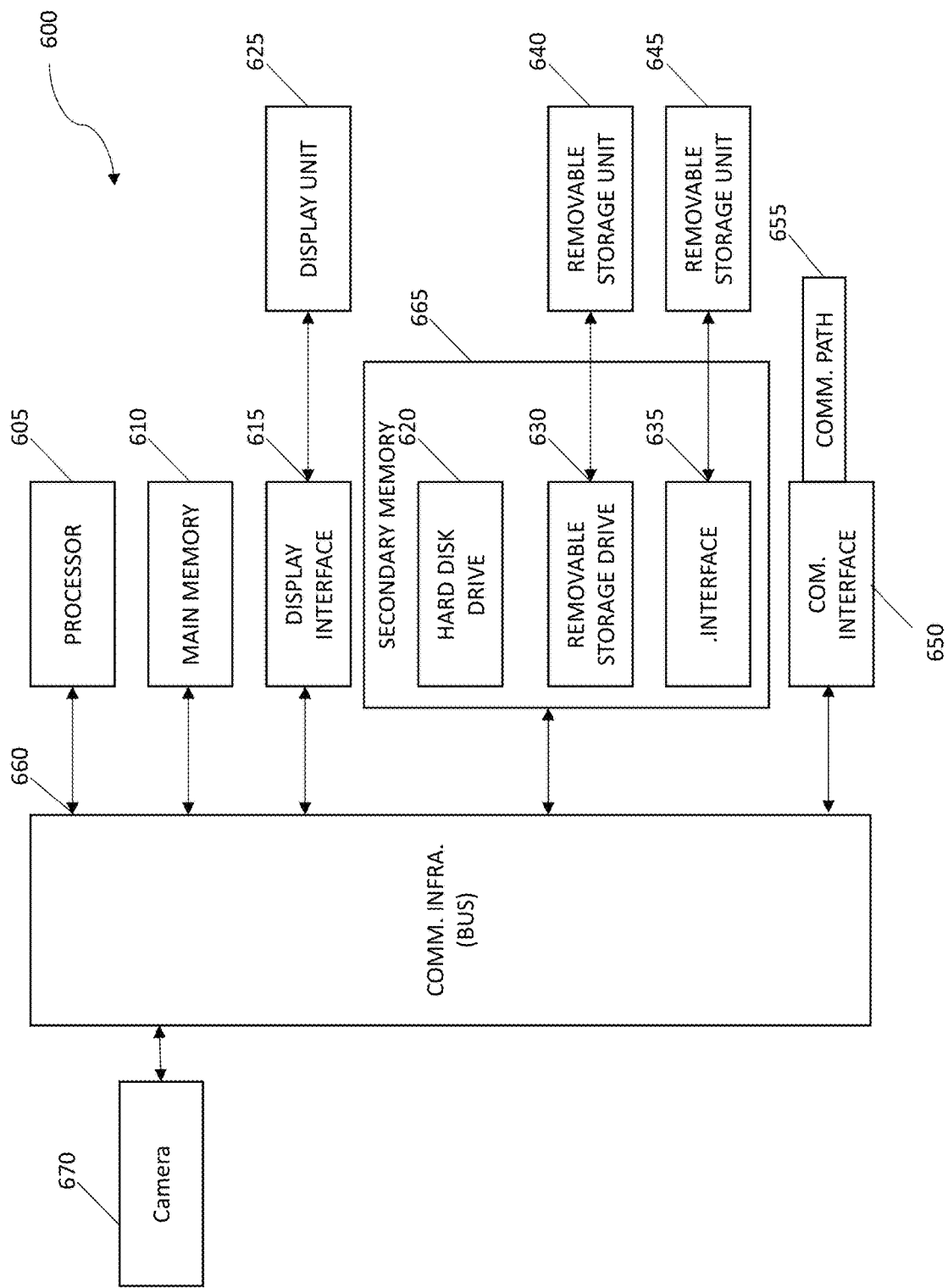
FIG. 6 depicts details of an exemplary computing system capable of implementing aspects of the invention.

FIG. 6 depicts details of an exemplary computing system capable of implementing aspects of the invention. FIG. 6 depicts a high level block diagram computer system 600, which can be used to implement one or more aspects of the present invention. Computer system 600 may act as a media device and implement the totality of the invention or it may act in concert with other computers and cloud-based systems to implement the invention. More specifically, computer system 600 can be used to implement some hardware components of embodiments of the present invention. Although one exemplary computer system 600 is shown, computer system 600 includes a communication path 655, which connects computer system 600 to additional systems (not depicted) and can include one or more wide area networks (WANs) and/or local area networks (LANs) such as the Internet, intranet(s), and/or wireless communication network(s). Computer system 600 and additional system are in communication via communication path 655, e.g., to communicate data between them.

Computer system 600 includes one or more processors, such as processor 605. Processor 605 is connected to a communication infrastructure 660 (e.g., a communications bus, cross-over bar, or network). Computer system 600 can include a display interface 615 that forwards graphics, text, and other data from communication infrastructure 660 (or from a frame buffer not shown) for display on a display unit 625. Computer system 600 also includes a main memory 610, preferably random access memory (RAM), and can also include a secondary memory 665. Secondary memory 665 can include, for example, a hard disk drive 620 and/or a removable storage drive 630, representing, for example, a floppy disk drive, a magnetic tape drive, or an optical disk drive. Removable storage drive 630 reads from and/or writes to a removable storage unit 640 in a manner well known to those having ordinary skill in the art. Removable storage unit 640 represents, for example, a floppy disk, a compact disc, a magnetic tape, or an optical disk, etc. which is read by and written to by removable storage drive 630. As will be appreciated, removable storage unit 640 includes a computer readable medium having stored therein computer software and/or data.

In alternative embodiments, secondary memory 665 can include other similar means for allowing computer programs or other instructions to be loaded into the computer system. Such means can include, for example, a removable storage unit 645 and an interface 635. Examples of such means can include a program package and package interface (such as that found in video game devices), a removable memory chip (such as an EPROM, or PROM) and associated socket, and other removable storage units 645 and interfaces 635 which allow software and data to be transferred from the removable storage unit 645 to computer system 600. In addition, a camera 670 is in communication with processor 605, main memory 610, and other peripherals and storage through communications interface 660.

Computer system 600 can also include a communications interface 650. Communications interface 650 allows software and data to be transferred between the computer system and external devices. Examples of communications interface 650 can include a modem, a network interface (such as an Ethernet card), a communications port, or a PCM-CIA slot and card, etcetera. Software and data transferred via communications interface 650 are in the form of signals which can be, for example, electronic, electromagnetic, optical, or other signals capable of being received by communications interface 650. These signals are provided to communications interface 650 via communication path (i.e., channel) 655. Communication path 655 carries signals and can be implemented using wire or cable, fiber optics, a phone line, a cellular phone link, an RF link, and/or other communications channels.

In the present description, the terms "computer program medium," "computer usable medium," and "computer readable medium" are used to generally refer to media such as main memory 610 and secondary memory 665, removable storage drive 630, and a hard disk installed in hard disk drive 620. Computer programs (also called computer control logic) are stored in main memory 610 and/or secondary memory 665. Computer programs can also be received via communications interface 650. Such computer programs, when run, enable the computer system to perform the features of the present invention as discussed herein. In particular, the computer programs, when run, enable processor 605 to perform the features of the computer system. Accordingly, such computer programs represent controllers of the computer system.

Many of the functional units described in this specification have been labeled as modules. Embodiments of the present invention apply to a wide variety of module implementations. For example, a module can be implemented as a hardware circuit comprising custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like.

Modules can also be implemented in software for execution by various types of processors. An identified module of executable code can, for instance, include one or more physical or logical blocks of computer instructions which can, for instance, be organized as an object, procedure, or function. Nevertheless, the executables of an identified module need not be physically located together, but can include disparate instructions stored in different locations which, when joined logically together, comprise the module and achieve the stated purpose for the module.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The invention claimed is:

1. A computer-implemented method comprising:
receiving, using a processor, a plurality of data inputs as a training set from a process;
selecting, using the processor, a data subset $I_0$ from the plurality of data inputs by solving linear programming to obtain a solution resulting in a subset of data inputs, wherein at least some of the subset of data inputs in data subset $I_0$ with label y are correctly classified and were assigned into a same leaf node, wherein all of the subset of data inputs in the data subset $I_0$ with a same label y inside a convex hull of $I_o$ conv($\{x_i|i \in I_o\}$) are dropped from the training set, where $x_i$ are removed training samples, and wherein correctly classifying the subset of data inputs in $I_0$ also correctly classifies remaining data inputs inside the convex hull;
building, using the processor, an optimal decision tree ("ODT") based on the data subset $I_0$ in which all of the subset of data inputs in the data subset $I_0$ with the same label y inside the convex hull of $I_o$ conv($\{x_i|i \in I_o\}$) have been dropped from the training set;
alerting, using the processor, a user when a prediction of a process failure results from the optimal decision tree is greater than a threshold value, in response to checking the prediction against the threshold value; and
in response to alerting the user when the prediction of the optimal decision tree is greater than the threshold value, implementing, by the processor, a control action based on analysis of the optimal decision tree, the control action adjusting a value of a feature vector input that results in a change to a prediction output of the prediction.

2. The computer-implemented method of claim 1, wherein selecting, using the processor, a data subset from the plurality of data inputs comprises performing, using the processor, a hyperplane data-selection to select the data subset.

3. The computer-implemented method of claim 1 further comprising performing, using the processor, data selection within each leaf node of the ODT to select the data subset.

4. The computer-implemented method of claim 1 further comprising using, using the processor, a set of cutting planes to strengthen the ODT.

5. The computer-implemented method of claim 1, wherein selecting, using the processor, a data subset from the plurality of data inputs comprises selecting the data subset such that points inside a convex hull of the data subset are maximized.

6. The computer-implemented method of claim 1, wherein the ODT comprises a multivariable decision tree.

7. A system comprising:
a memory;
a processor communicatively coupled to the memory, the processor operable to execute instructions stored in the memory, the instructions causing the processor to:
receive a plurality of data inputs as a training set from a process;
select a data subset $I_0$ from the plurality of data inputs by solving linear programming to obtain a solution resulting in a subset of data inputs, wherein at least some of the subset of data inputs in data subset $I_0$ with label y are correctly classified and were assigned into a same leaf node, wherein all of the subset of data inputs in the data subset $I_0$ with a same label y inside a convex hull of $I_o$ conv($\{x_i|i \in I_o\}$) are dropped from the training set, where $x_i$ are removed training samples, and wherein correctly classifying the subset of data inputs in $I_0$ also correctly classifies remaining data inputs inside the convex hull;
build an optimal decision tree ("ODT") based on the data subset $I_0$ in which all of the subset of data inputs in the data subset $I_0$ with the same label y inside the convex hull of $I_o$ conv($\{x_i|i \in I_o\}$) have been dropped from the training set;
alert a user when a prediction of a process failure results from the optimal decision tree is greater than a threshold value, in response to checking the prediction against the threshold value; and
in response to alerting the user when the prediction of the optimal decision tree is greater than the threshold value, implement a control action based on analysis of the optimal decision tree, the control action adjusting a value of a feature vector input that results in a change to a prediction output of the prediction.

8. The system of claim 7, wherein selecting a data subset from the plurality of data inputs comprises performing a hyperplane data-selection to select the data subset.

9. The system of claim 7, wherein the instructions further cause the processor to perform data selection within each leaf node of the ODT to select the data subset.

10. The system of claim 7, wherein the instructions further cause the processor to use a set of cutting planes to strengthen the ODT.

11. The system of claim 7, wherein selecting a data subset from the plurality of data inputs comprises selecting the data subset such that points inside a convex hull of the data subset are maximized.

12. The system of claim 7, wherein the ODT comprises a multivariable decision tree.

13. A computer program product for creating and optimizing a decision tree, the computer program product comprising a computer readable storage medium having program instructions embodied therewith, the program instructions executable by a computer, to cause the computer to perform a method comprising:

receiving a plurality of data inputs as a training set from a process;

selecting a data subset $I_0$ from the plurality of data inputs by solving linear programming to obtain a solution resulting in a subset of data inputs, wherein at least some of the subset of data inputs in data subset $I_0$ with label y are correctly classified and were assigned into a same leaf node, wherein all of the subset of data inputs in the data subset $I_0$ with a same label y inside a convex hull of $I_o$ conv($\{x_i | i \in I_o\}$) are dropped from the training set, where $x_i$ are removed training samples, and wherein correctly classifying the subset of data inputs in $I_0$ also correctly classifies remaining data inputs inside the convex hull;

building and optimizing an optimal decision tree ("ODT") based on the data subset $I_0$ in which all of the subset of data inputs in the data subset $I_0$ with the same label y inside the convex hull of $I_o$ conv($\{x_i | i \in I_o\}$) have been dropped from the training set; and alerting a user when a prediction of a process failure results from the optimal decision tree is greater than a threshold value, in response to checking the prediction against the threshold value; and in response to alerting the user when the prediction of the optimal decision tree is greater than the threshold value, implementing a control action based on analysis of the optimal decision tree, the control action adjusting a value of a feature vector input that results in a change to a prediction output of the prediction.

14. The computer program product of claim 13, wherein selecting a data subset from the plurality of data inputs comprises performing a hyperplane data-selection to select the data subset.

15. The computer program product of claim 13, wherein the instructions further cause the computer to perform data selection within each leaf node of the ODT to select the data subset.

16. The computer program product of claim 13, wherein the instructions further cause the computer to use a set of cutting planes to strengthen the ODT.

17. A computer-implemented method of claim 1, further comprising training an artificial intelligence model to anticipate events by using predictions from the ODT.

\* \* \* \* \*